Patented Feb. 17, 1942

2,273,326

UNITED STATES PATENT OFFICE 2,273,326

SAND MOLD

William F. McKee, Belleville, Ill., assignor to Cortner M. Hardy, Henderson, Ky.

No Drawing. Application July 8, 1940,
Serial No. 344,377

4 Claims. (Cl. 22—189)

This invention relates to a certain new and useful improvement in sand-molds and the like.

An efficient mold for the production of a metal casting, as is well known, should have suitable compression strength and yet be sufficiently permeable for properly venting the gases developing in the mold cavity during and following the pouring of the particular metal. Consequently, sands of more or less coarse granular structure have come into quite common use today as the body or base of the mold, the sand being impregnated and mixed with suitable binding composition, ingredients, or constituents to give the mold the ultimate physical properties, such, for instance, as hardness, porosity or permeability, and compression strength, desired.

However, almost invariably, so far as I am aware, the surface of such molds is rough compared to the surface desired and the sand grains are often loose and uneven, as I may say, and frequently flake off during handling and use, with the result that the casting has an unsatisfactory surface and often requires considerable machining and grinding.

Furthermore, a casting of the specific or desired dimensions, contour, and configuration will not result from the use of a flaked-off and hence surface-imperfect mold, again necessitating corrective machining or even complete casting rejection.

My invention hence has for its primary object and resides in the production of a sand-mold having a smooth, relatively hard, porous or permeable and substantially non-flakable surface for the production, in turn, of consequently smooth, even, and uniform castings of the desired dimensions, contour, and configuration and with the elimination largely of surface finishing machining and the reduction of cleaning operations.

My invention has for a further object and also resides in the provision and method of use of a composition in the form of a spray or so-called wash for convenient application to and upon the mold for finishing the surface thereof for the production of molds having the characteristics mentioned.

Now with such and other objects in view, my new spray or wash is at time of application upon the particular mold in the form of a liquid or fluid composition compounded principally of alcohol and resin, the latter being preferably of a quick-drying type, such, for instance, as gasoline-insoluble pinewood resin.

Such surface coating agent or wash may be made by dissolving the resin in any of the commercial solvents, the quantity or amount of the resin dissolved regulating or determining the strength or binding properties of the spray, thereby determining the surface hardness of the mold. Such quantity or amount may be varied, depending upon the size or shape of the particular mold or metal being cast, and either the solution or the particular solvent may be blended to the desired viscosity by the addition of a petroleum ether, for instance, so-called extraction naphtha, depending upon the rate of solvent volatility and binding strength desired in the ultimate spray or wash. For example, a five gallon mix of the surface coating agent or liquid may be made up according to the following formula, namely, anhydrous alcohol, one gallon, petroleum ether, four gallons, and pulverized gasoline-insoluble pinewood resin, one and a half pounds.

The spray or wash requires only limited mixing and simple mixing equipment, and, in use and practice, may be either ignited or permitted to air dry on the mold, core, or the like. In either procedure, after the alcohol or solvent has been consumed or evaporated off, the so treated mold, core, or the like will have an extremely smooth, hard, and firmly bonded yet permeable skin which possesses and is characterized by excellent venting properties, and which will not readily disintegrate or flake upon handling—indeed the mold or core will accurately maintain its shape and enable the production of smooth castings of the desired dimensions, contour, and configuration, the relatively hard, smooth skin of the mold or core permitting the molten metal to flow freely and evenly and obviating eddy currents, flow streaks and various other faults or types of internal distortion in the finished casting, and surface machining.

The surface coating liquid or spray of my invention, if stored or permitted to stand, will neither precipitate out nor, except for evaporation, undergo any physical or chemical changes. On the contrary, the spray or wash will maintain a perfect solution and consequently will neither erode or wear out the tips of spray guns or other applying tools.

Further, the spray or wash is quickly self-drying, it may be said, reduces the drying period to approximately ten to fifteen minutes, and effects large economies and savings in casting production by the elimination of preliminary drying ovens and equipment as well as also the labor of additional handling and storing of molds. By the use of this mold spray or wash, if the molds are ignited immediately after spraying or washing, the green sand mold becomes the equivalent of a skin dried mold within a period of ten minutes or less.

The coating liquid does not decrease the size of the mold cavity or core prints, nor does it obliterate lettering, pattern-marking, or stenciling of any kind, since it is a true solution and flows readily around the sand grains and into the interstitial spaces of the mold surface instead of remaining as an additive superficial surface film. Consequently, as previously intimated, castings are substantially truer to pattern dimensions, and by reason of the fact that the surface of the core or mold is tightly bonded and smooth, erosion of the core or mold surface is substantially eliminated and sand inclusions, scabbing, and rat tails in the finished casting obviated.

The surface coating or spray also generates a reducing atmosphere in the mold cavity, causing the metal to run more smoothly, with the result that the finished casting will be substantially free from wrinkles or so-called cold laps.

The spray or wash effects a hard surface skin on the mold, leaving the sand immediately beneath the surface relatively soft, compressible, and easy to move while casting is shrinking upon cooling, with the additional result that casting cracks are greatly prevented.

Further, the spray or wash may be applied with ease and facility and effects the production of molds or cores which are substantially water resistant and comparatively unaffected by atmospheric changes, and I may add that the cost and time required in cleaning castings following the use of the spray or wash is greatly reduced, the fused or sintered sand grains peeling readily from the castings.

I may add that finely ground silica flour, bentonite and other clays, plumbago, graphite, and other refractory materials may be employed in suitable quantities in the spray or wash at time of application for bettering the mold finish and augmenting the refractivity of mold surface or skin, and it is to be understood that other changes and modifications in the form and proportions of the ingredients or constituents of the spray or wash and in the applications and methods of use thereof may be made and substituted for those herein described without departing from the nature or principle of my invention.

Having thus described my invention, what I claim and desire to secure by Letters Patent is:

1. A surfacing composition for sand-molds and the like comprising pinewood resin in solution with a volatile solvent.

2. A surfacing composition for sand-molds and the like comprising pinewood resin in solution with anhydrous alcohol.

3. A surfacing composition for sand-molds and the like comprising gasoline-insoluble pinewood resin in solution with a volatile solvent.

4. A molded sand-body adapted for use as a foundry mold or core including a sand-body having its surface bindingly coated with a sprayed film of a solution comprising a gasoline-insoluble pinewood resin and a volatile solvent.

WILLIAM F. McKEE.